US009537869B2

(12) United States Patent
Peterson

(10) Patent No.: US 9,537,869 B2
(45) Date of Patent: *Jan. 3, 2017

(54) GEOGRAPHICAL RESTRICTIONS FOR APPLICATION USAGE ON A MOBILE DEVICE

(71) Applicant: Blue Cedar Networks, Inc., San Francisco, CA (US)

(72) Inventor: Erik L. Peterson, Vallejo, CA (US)

(73) Assignee: Blue Cedar Networks, Inc., San Francisco, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/223,766

(22) Filed: Mar. 24, 2014

(65) Prior Publication Data

US 2014/0208397 A1    Jul. 24, 2014

Related U.S. Application Data

(63) Continuation-in-part of application No. 13/924,194, filed on Jun. 21, 2013, now Pat. No. 9,306,933, which
(Continued)

(51) Int. Cl.
*H04L 29/06* (2006.01)
*H04W 4/02* (2009.01)
(Continued)

(52) U.S. Cl.
CPC ......... *H04L 63/107* (2013.01); *G06F 21/123* (2013.01); *G06F 21/51* (2013.01); *H04W 4/021* (2013.01); *H04W 12/08* (2013.01)

(58) Field of Classification Search
None
See application file for complete search history.

(56) References Cited

U.S. PATENT DOCUMENTS 7,156,328 B2 *   1/2007   Samaha .............. A01G 25/092
                                                    239/728
7,941,700 B2     5/2011   Schlesinger et al.
(Continued)

FOREIGN PATENT DOCUMENTS

IL    WO 0217139 A1 *   2/2002   ......... G06F 17/3087

OTHER PUBLICATIONS

Matt Hamblen, "New Version of Mobile Management Released by MobileIron," Computerworld Online, http://www.computerworld.com/s/article/9184159/New_version_of_mobile_management_released_by_MobileIron, Sep. 9, 2010.
(Continued)

*Primary Examiner* — Farid Homayounmehr
*Assistant Examiner* — Olanrewaju Bucknor
(74) *Attorney, Agent, or Firm* — Kwan & Olynick LLP

(57) ABSTRACT

Apps are secured or security-wrapped either before they are downloaded onto a device, such as a smart phone or tablet device, or after they are downloaded but before they are allowed to access the device operating system and cause any potential damage to the device. The app is secured before it is allowed to access the operating system of the device, thereby preventing the app from malicious behavior. App object code is substituted with security program object code, thereby creating a security-wrapped app. The app is provisioned with a geo-fencing policy which prevents execution of an app outside a pre-defined geographical area. If the device is within the defined area, the app is allowed to execute. The geographical area, such as a building or company campus, is defined using longitude and latitude coordinates and a location accuracy value. Device location is obtained using location/GPS services on the device.

6 Claims, 12 Drawing Sheets

Related U.S. Application Data is a continuation-in-part of application No. 13/875,151, filed on May 1, 2013, now Pat. No. 8,990,920, which is a continuation-in-part of application No. 13/025,994, filed on Feb. 11, 2011, now Pat. No. 8,549,656.

(60) Provisional application No. 61/662,555, filed on Jun. 21, 2012, provisional application No. 61/806,271, filed on Mar. 28, 2013.

(51) Int. Cl.
  *G06F 21/51*  (2013.01)
  *H04W 12/08*  (2009.01)
  *G06F 21/12*  (2013.01)

(56) References Cited

U.S. PATENT DOCUMENTS

| | | | |
|---|---|---|---|
| 8,190,785 B2 | 5/2012 | Hill et al. | |
| 8,196,169 B1* | 6/2012 | Herz | H04N 21/25841 725/25 |
| 8,326,326 B2* | 12/2012 | Li | G01S 5/0018 455/456.2 |
| 8,471,701 B2* | 6/2013 | Yariv | G01C 21/3679 340/539.13 |
| 8,594,715 B1* | 11/2013 | Stewart | G06Q 50/01 370/310 |
| 8,929,916 B2* | 1/2015 | Gordon | H04W 64/00 455/404.2 |
| 9,055,433 B2* | 6/2015 | Maguire | H04L 51/32 |
| 2002/0184401 A1* | 12/2002 | Kadel, Jr. | G06F 8/76 719/315 |
| 2006/0059561 A1* | 3/2006 | Ronning | G06F 21/10 726/26 |
| 2006/0271921 A1 | 11/2006 | Cronce et al. | |
| 2007/0106958 A1 | 5/2007 | Kumashio | |
| 2007/0136207 A1 | 6/2007 | Davydov | |
| 2007/0192864 A1 | 8/2007 | Bryant et al. | |
| 2007/0245409 A1 | 10/2007 | Harris et al. | |
| 2008/0047023 A1 | 2/2008 | Lam et al. | |
| 2008/0155094 A1* | 6/2008 | Roese | G01S 5/02 709/224 |
| 2010/0227629 A1* | 9/2010 | Cook | H04W 64/00 455/456.4 |
| 2011/0239306 A1 | 9/2011 | Avni et al. | |
| 2012/0259909 A1 | 10/2012 | Bachelor et al. | |
| 2012/0310527 A1* | 12/2012 | Yariv | H04W 4/021 701/426 |
| 2013/0132268 A1* | 5/2013 | Cooper | G06Q 40/025 705/38 |
| 2014/0349698 A1* | 11/2014 | Burks | H04W 52/383 455/518 |

OTHER PUBLICATIONS

U.S. Office Action dated Oct. 18, 2012 from U.S. Appl. No. 13/025,994.

Nukona App Center, "Everything You Need to Secure, Deploy and Manage Your Apps on Personal Devices", https://www.nukona.com/products, Jul. 7, 2011.

Good Technology, Inc., "Taking Secure Steps to Enterprise Mobility—On The Most Popular Devices", http://www.good.com/products, Jul. 7, 2011.

Lookout Mobile Security, https://www.mylookout.com/download, Apr. 2010.

Android Community, "Amazon App Store Lures You in With Free Apps, Makes You Stay if You Want to Keep Them", http://androidcommunity.com/amazon-app-store-lures-you-in-with-free-apps-makes-you-stay-if-you-want-to-keep-them-20110614/?utm_medium=referral&utm_source=pulsenews, pp. 1-2 , Jul. 13, 2011.

International Search Report dated May 23, 2012 from International Application No. PCT/US 12/24080.

Written Opinion dated May 23, 2012 from International Application No. PCT/US 12/24080.

U.S. Final Office Action dated May 21, 2013 from U.S. Appl. No. 13/025,994.

Notice of Allowance dated Aug. 27, 2013 from U.S. Appl. No. 13/025,994.

\* cited by examiner

GEOGRAPHICAL RESTRICTIONS FOR APPLICATION USAGE ON A MOBILE DEVICE

CROSS-REFERENCE TO RELATED APPLICATIONS

This application claims priority under U.S.C. §119(e) to U.S. Provisional Application No. 61/806,271 filed Mar. 28, 2013, and is also a Continuation-in-Part under 35 U.S.C. §120 to U.S. patent application Ser. No. 13/924,194, filed Jun. 21, 2013. U.S. patent application Ser. No. 13/924,194 claims priority under U.S.C. §119(e) to U.S. Provisional Application No. 61/662,555, filed Jun. 21, 2012 and is a Continuation-in-Part under 35 U.S.C. §120 to U.S. patent application Ser. No. 13/875,151, filed on May 1, 2013. U.S. patent application Ser. No. 13/875,151 is a Continuation-in-Part under 35 U.S.C. §120 to U.S. patent application Ser. No. 13/025,994, filed Feb. 11, 2011, now issued U.S. Pat. No. 8,549,656. All applications are hereby incorporated by reference in their entirety.

BACKGROUND OF THE INVENTION

1. Field of the Invention

The present invention relates to software apps and mobile devices. More specifically, it relates to software for controlling the use of apps on mobile devices based on geographical location of the device and other location data.

2. Description of the Related Art

As is now known in the computing and mobile handset and smart phone industries, a new computing paradigm is emerging and is being driven by the proliferation of software applications now commonly known as apps for handheld or mobile devices. This proliferation is directly tied to consumer adoption of smart phones and tablets. Enterprises are now creating their own unique apps and distributing them to employees, customers, and partners. Companies are now writing their own apps for their employees and partners to use. However, with this growth another problem is arising, namely, the security and management of these apps on handset devices. Apps can cause significant damage to a handheld device and can cause loss of data or unintended transmission of data. They pose vulnerabilities for the device and a security risk for the user.

Traditional anti-virus approach, such as provided by MyLookOut, does not remove damage done by an app on a handset device. While black listing of apps is partially adequate for protecting devices (not only apps on the list to be downloaded), it would be better if there was a method to contain damage that a malware-infected app has done on a mobile device. It would be preferred if the kernel of the operating system software for the mobile device did not have to be altered. It would also be preferred if the app author did not have to be trained in the art of secure programming, or write anything special or customized for security when writing the app—they should be able to simply continue writing apps as they are currently doing. It would also be desirable if a policy for app usage was tied to geographical location of the device such that the user of the device could not use a specific app if outside a certain physical area, such as a building, company campus, city, and the like.

SUMMARY OF THE INVENTION

In one aspect of the invention, a method of securing and provisioning an app for execution on a device using a security program is described. The app is provisioned with what is referred to as a "geo-fencing" policy. The app securing aspect involves obtaining the core object code of the app and removing the digital signature. App object code is substituted with security program object code, thereby creating a security-wrapped app. The provisioning aspect involves using the geo-fencing policy parameters to define a geographical area, such as a building or company campus, in which the app will execute on the device, within a certain margin of error, such as 10, 100, or 1000 meters. If the device is outside the defined area, the app will not execute, again taking into consideration a margin of error. When defining the area during geo-fencing provisioning, the latitude and longitude coordinates and a location accuracy value are set. The device location is obtained using location services on the device which typically also have a location accuracy value. In this manner a centralized policy to control and secure access to data is implemented on the device.

In another aspect of the invention, a method of executing an app on a device is described. A device obtains location data using conventional means, such as GPS or other location services on the device. The location data, typically in the form of latitude and longitude coordinates plus an accuracy value (e.g., 10, 100, or 1000 meters), is transmitted to an app on the device. The app has been secured and provisioned using a geo-fencing policy. When provisioned, a geographical area in which the app is allowed to execute has been defined and a location accuracy setting (a type of "margin of error") has also been entered. The app is allowed to execute if the device is in the defined area and within the margin of error. A location circle for the device is determined using the location accuracy setting as the radius of the circle and the device location coordinate as the center of the circle. If the location circle intersects or is within the defined geographical area, then the app is allowed to execute otherwise the app is blocked. If the device goes from within the defined area to outside the area and outside the margin of error, then the app terminates automatically.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1A:
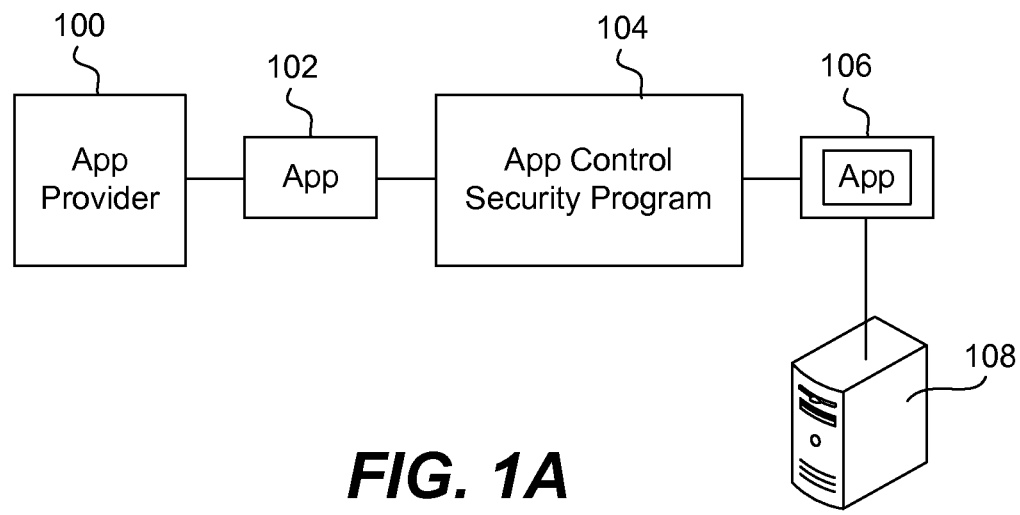
FIG. 1A is a block diagram showing an overview of the app control process of the present invention.

Example embodiments of an application security process and system are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for preventing device software applications from infecting or otherwise damaging a device, in particular, a mobile device, are described in the various figures. These types of applications, used often on a variety of mobile devices, such as smart phones, tablet computers, gaming devices, and portable computing devices are commonly referred to as "apps." These apps may also be downloaded on to non-mobile devices, such as TVs, computers, automobiles, and other emerging smart device categories. Methods and systems described are not intended to be limited to operation on mobile devices. These device programs or apps have proliferated and are now very prevalent. Currently, apps are typically written in either Java or C. The methods and systems described herein may be applied to apps written in either or to apps written in other languages for different platforms. Most apps, if not all, have to communicate with the mobile device's operating system to get a specific service that the app needs in order to perform its intended function and this service is usually only available from the operating system. A common example of such a service used is GPS to get the location of the device which the app may need. However, because of this exposure, apps are a vulnerability for the device and pose a security and privacy risk for the user. Companies want to be able enforce a centralized policy to control and secure access to its data and software. This is also true for end users (i.e., individuals, home users, and the like). It enables enterprise IT departments to maintain governance of corporate data. The methods described below provide a centralized way to control security with respect to apps that are downloaded onto mobile devices, where the devices are either an employee's personal phone or an employer's phone, so that those apps do not pose a security threat. Various embodiments of the invention may also be used by parents and individuals (i.e., in home or non-work environments) to ensure that their personal mobile devices are safe from malware and may also be used to apply controls, such as on usage. Embodiments of the app control software of the present invention may also be used for mobile device data protection and back-up and for application-level telemetry.

FIG. 1A is a block diagram showing an overview of the app control process of the present invention. It is a generic description of one process without being tied to a specific configuration or environment. An app 102 is provided by app provider 100 which can be any type of entity (individual, software developer, employer, etc.). It is generally unprotected and the only security surrounding it is provided by the operating system. The only shield and checking done on how it executes on the device once loaded is provided by the operating system.

The present invention enables additional security of the apps that is not provided by the device's operating system. A security application program 104 is applied to app 102. Or the app 102 is input to program 104, which may be supplied by a third-party app security provider. In one embodiment, security application program 104 has a policy manager and a policy wrapper which may be in different locations. They are described in greater detail in FIG. 2. Once security program 104 has been applied to app 102, the app is wrapped with a security layer so that the device is protected. It is shown as secured app 106. In one embodiment, secured app 106 is then downloaded onto a mobile device 108, such as a smart phone or tablet computer, where it executes securely without risking damage to device 108. Another benefit is that secured app 106 may also be managed by the company or other entity that is providing the app to the user, such as an employer providing the app to an employee. For example, if the user leaves the company, the company may automatically delete the app and any related data from the device. In another example, a parent may be able to limit the apps used by another person (e.g., a child) or to limit the amount of time, e.g., 10 minutes a day or limit which Web sites may be accessed by an app. Or, a parent is concerned that an app is leaking a child's location to unknown third parties. There may be numerous other examples. As noted, FIG. 1A is intended to show the general process of securing an app and downloading it onto a device. Note that in this embodiment, app 102 is not made secure from causing harm to the device after it is downloaded onto the device, but before. In another embodiment, the app is secured after it is downloaded onto the device, but before it can interact with the operating system.

Figure 1B:
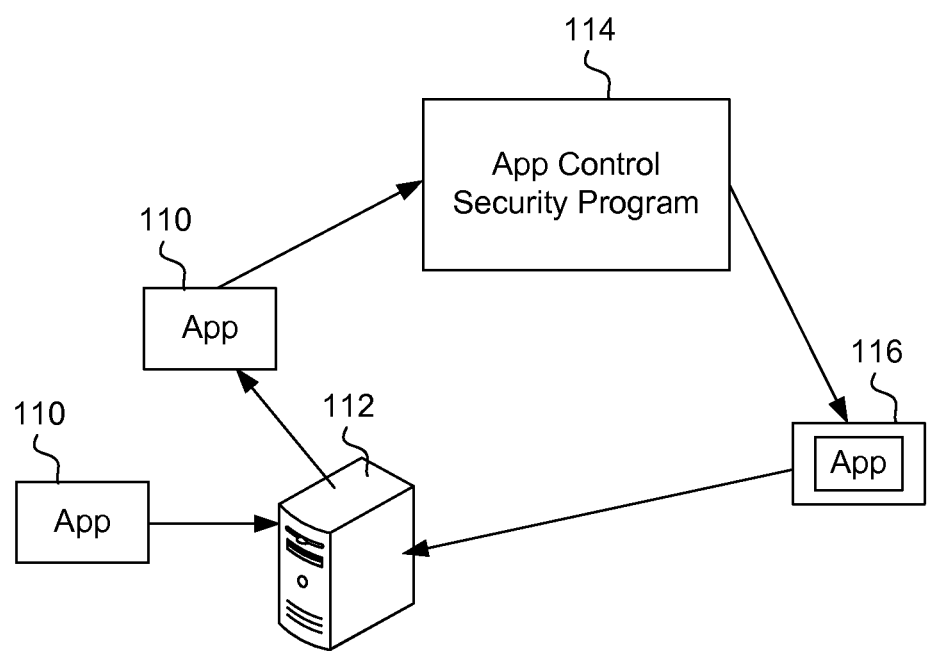
FIG. 1B is a block diagram showing an alternative embodiment of an app control process of the present invention.

FIG. 1B is a block diagram showing an alternative embodiment. An unsecured app 110 (also supplied by an app provider) is downloaded onto mobile device 112. In this embodiment, however, there may be a specially designed app on device 112 that blocks the actual installation of unsecured app 110. The special app (not shown) redirects unsecured app 110 to an app security program 114. The unsecured app 110 is wrapped in a security policy, the resulting app shown as secured app 116. It is then downloaded and allowed to be installed on device 112 by the special app. In this manner, an individual or home user, for example, who wants to protect her phone from security threats posed by apps, can have apps made secure (wrapped) by a third-party service or by her mobile phone carrier, to mention only two examples, before they are downloaded on to her phone. It should be noted that this security wrapping can be done to an app regardless of where the user downloads the app from. It may also be noted that in FIGS. 1A and 1B, the network and connections between the components and software are shown generically. The transmissions are primarily over the Internet (not shown) but may also be within a private network or both.

Figure 2:
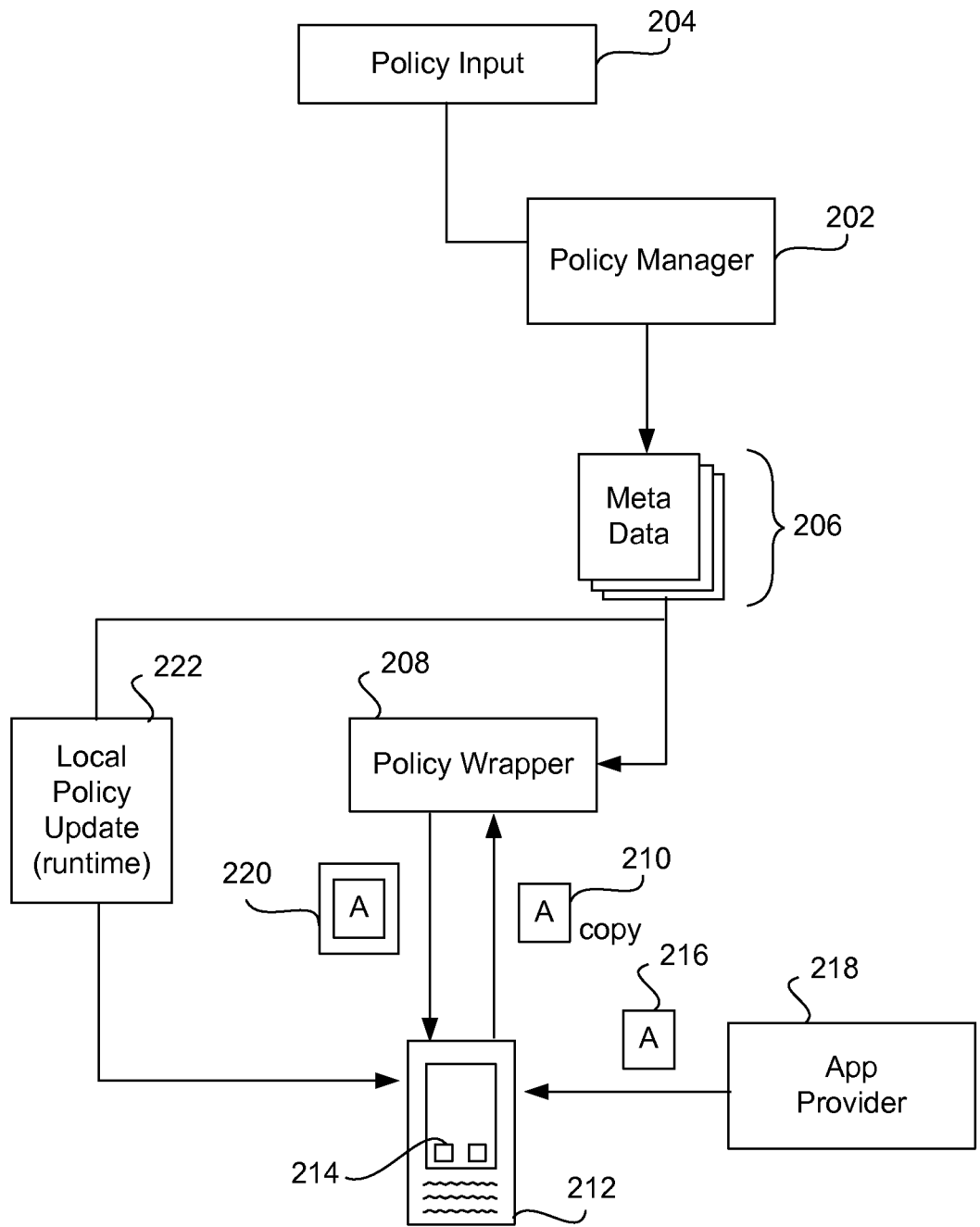
FIG. 2 is a block diagram showing components of an app security program in accordance with one embodiment of the present invention.

FIG. 2 is a block diagram showing components of an app security program in accordance with one embodiment of the present invention. In one embodiment, the security program has two major components, a policy manager and a policy wrapper. A policy manager 202 accepts input from an administrator or other individual who is responsible for setting security for the mobile device. The person may be referred to as the governor since he is governing the security of the one or more mobile devices. The security policy may be set using various user interface screens. There are numerous examples of policies, including geo-fencing (e.g., the app can only be used in a building) and others. The service provider or the entity providing the app security program may also provide default policy and security settings which may be useful for home users. Examples of policy settings are described below. Policy input 204 is inputted into policy manager 202. Policy manager 202 takes the input/settings from the governor and creates policies or meta-data 206. The format or form of meta-data 206 can vary. They essentially reflect the policy settings from the governor.

Metadata (policies) 206 may be used as input to a policy wrapper 208. In one embodiment, this component of the program takes the policies and uses them to secure an app 210 by wrapping it. Wrapper 208 receives an app 210 from a handheld device 212. In one embodiment, wrapper 208 receives a copy of an app 210 instead of the original app 214 that was downloaded onto phone 212 (see FIG. 1B above). Here the handheld device 212 user attempts to download an unsecured app 216 from an app provider 218. In the scenario in described in FIG. 1A, it may operate on the app itself instead of a copy. This may be the case where a market place or app store offers customers a secured version of the app along with an unsecured version (or only offer the secured version). A secured version 220 (security-wrapped version) is returned from policy wrapper 208 to device 212.

Metadata 206 may also be used to update a local policy file (an existing policy that is already on the device). A local policy file is used to update policy parameters residing on device 212. For example, in the case of "geofencing" (i.e., restricting use of an app to an certain physical areas) it is likely that the GPS locations controlled by the governor will change over time. When such a change occurs, the new policies can be applied in two different ways. One is to generate a new policy and apply it to the original app (i.e., wrap the app with the new policy). Another way is to allow dynamic configuration based on a local policy data file with the "variable" part of the policy encrypted/signed inside it. For example, an IT person may want the ability to override a configuration on a device directly through an IT app residing on the device for diagnostic purposes.

In one embodiment policies have two components: a fixed part and a variable part. The fixed part is the content described in the policy file (e.g., "protect the GPS at certain times of day"). The variable part typically is provided by the governor through a console (e.g. "what are the times when the GPS should be protected?"). The variable part can change without applying a new policy.

Policy designers can choose to forego the variable component of the policy and basically "embed" all data or content statically in the policy file. In this case, the console does not have any way to customize the policy.

If the policy designer chooses to include some variable component in the policy, when changes are made to the variable data (on the console), a new data file could be sent to the device to reflect the latest changes. Such a file would be encrypted/signed (to prevent a malicious app circumventing the policy), downloaded to the device, and used by the app security code on the device to apply the new data to the appropriate policy.

Such changes and updates may be done by local policy update component 222 at runtime. This component creates updated policy parameters on device 212. Thereafter, wrapped app 220 will use the updated policy parameters.

In one embodiment, policy manager 202 and policy wrapper 208 are components in the same app security program and may operate on the same computer. In other embodiments, the manager and wrapper components may be on separate computers. For example, the policy manager 202 may be on a server at one site and the policy wrapper 208 may be on a computer at another site and may be managed by a different entity or the same entity. Collectively the manager and wrapper form the app security program which, in one embodiment, is operated by a security service provider. It may also be provided by an enterprise, such as a company, employer, business partner, and the like, or by a mobile phone carrier.

Figure 3:
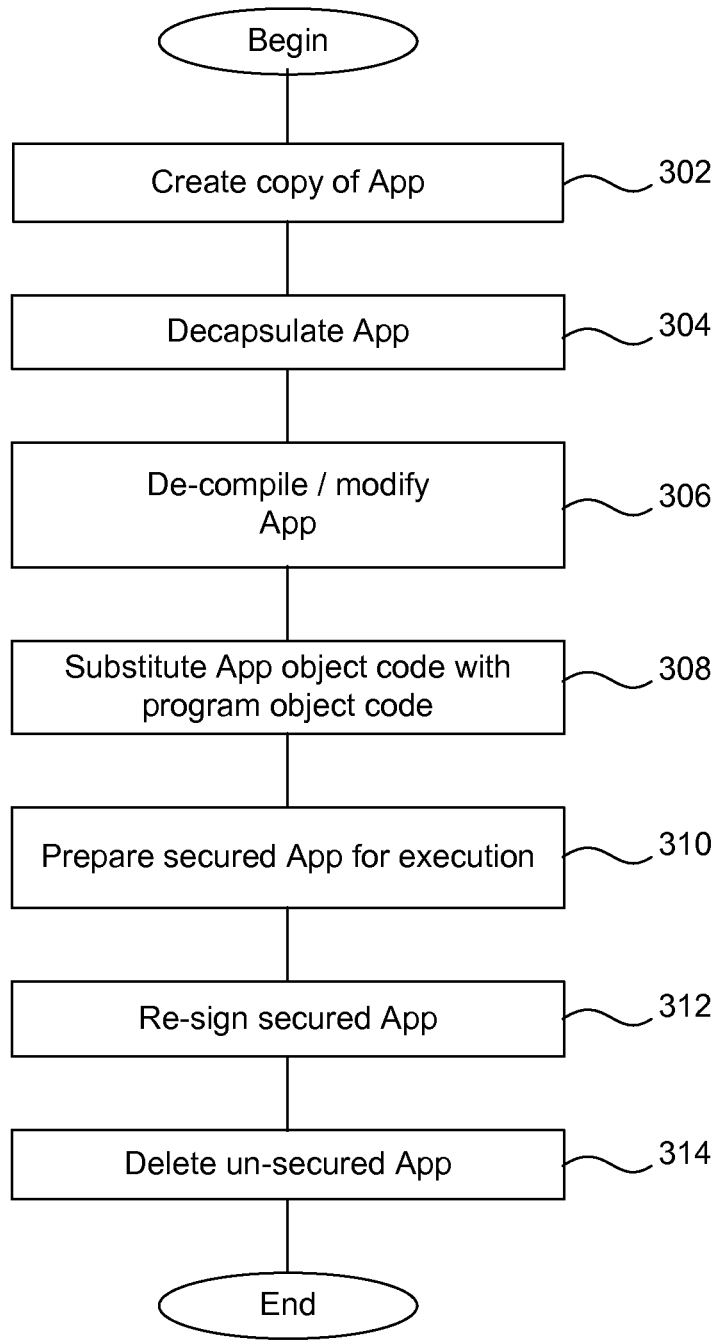
FIG. 3 is a flow diagram showing a process of making an app secure before downloading it on to a device in accordance with one embodiment of the present invention.

FIG. 3 is a flow diagram showing a process of making an app secure before downloading it on to a device in accordance with one embodiment of the present invention. At step 302 a copy or clone of the app that is to be secured is made on the device. In one embodiment, this may be done on the mobile device itself or may be done off the device, for example, on components on the Internet, in the cloud, on an enterprise's server or on a carrier server. The user may be an individual, an employee of a company or other entity. As is known in the field, an app may be obtained in a number of ways, most typically from an app store or an app market, or directly from the app developer or provider or in any suitable manner. By making a copy, the original app is preserved giving the user an option to use either the secured or unsecured version and also protects the user's ability to use the app if something goes wrong with the app control process. Note that in one embodiment, the app is not yet downloaded on to the phone. In one embodiment, the methods described below are performed on separate computing devices. In another embodiment, the process may be performed on a mobile device, but the app is only executed on the device after the process is complete and the app has been made secure.

At step 304 the app is decapsulated. Most, if not all, apps have digital signatures signed by the author/developer. At step 304, as part of the decapsulation, the digital signature is removed from the app. This may be done using techniques known in the art. Decrypting the app may also be performed at this step. These and other steps provide the core object code of the app which may now be operated on by the app control program. The nature and specifics of this operation may depend on the mobile device's operating system.

There are several examples of operating systems for smart phones such as iOS (for the iPhone), Android (used on handsets from various manufacturers), Windows Mobile 7, Web O/S, Palm, and others. At step 306, the core object code app may be either disassembled or decompiled to obtain the executable object code. For example, it can be either "native code" (CPU instructions) or bytecode (virtual machine instructions, such as Java or .Net). In one embodiment, this may be more of a modification process if the device runs iOS where the disassembly is closer to a process of locating and substituting certain links and terms. However, in general, the disassembly process to obtain the object code of an app after it has been decapsulated may be done using techniques known in the art, such as using disassemblers.

At step 308 the app object code is augmented with object code from the app security program. For example, this object code may include class files which are replaced with class files from the security program. The object code generally provides an interface to the mobile device operating system. The app control security program object code is derived, in part, from the policy/meta-data described above. In the case of iOS, the operation is different in that a 'locate and substitute' process occurs rather than an object code replacement. This takes into consideration an interrupt approach that iOS's uses. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

At step 310, after substitution of the object code (or substitutions of SWIs) has been made, the app security program prepares the security wrapped app for execution on the mobile device. The object code substituted into the app by the security program generally provides a bridge or connection between the app and the mobile device operating system. The security program class files may be described as wrapping around the operating system class files. The app security program class files are generated based on the policies created earlier (by input from the governor). The app is essentially re-wired for execution on the handset. It is re-wired to use the app security program layer in addition to the security provided by the mobile device operating system layer. That is, the secured app may still be subject to the security provisions of the operating system. In one embodiment, certain cosmetic changes may also be made to the app, such as changing the icon for the app to reflect that it is secured. By doing this, the user can be sure that when the app icon appears on the handset screen that the secured version of the app will be executed. The app has now essentially been re-factored or re-programmed by the security program.

At step 312 the app is signed with a new key, for example, with the key of the service provider or the key of the enterprise providing the secured app. The re-factored, secured version of the app is returned to the handset device. In another embodiment, the app is wrapped with the security layer on the phone. At step 314, in one embodiment, the original, unsecured copy of the app is deleted from the handset device. This may be done by the secured version of the app once it is downloaded onto the handset. In other embodiments, this is not done and both versions remain on the mobile device. At this stage the process is complete.

Figure 4:
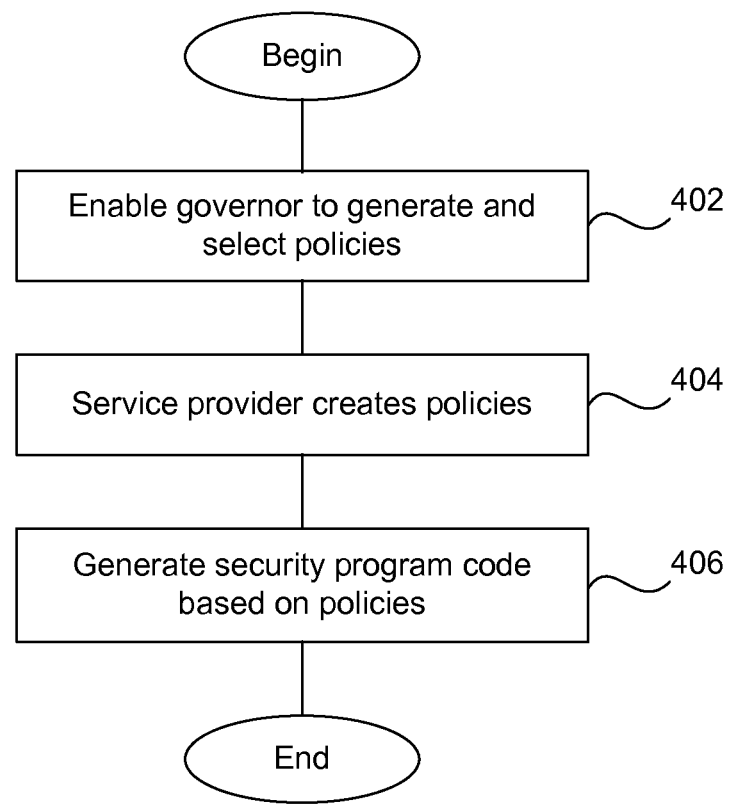
FIG. 4 is a flow diagram of a method performed in policy manager in accordance with one embodiment.

FIG. 4 is a flow diagram of a method performed in policy manager 202 in accordance with one embodiment. At step 402 the governor or other security policy individual is enabled to define, generate, and create security policies. This may be a network administrator for an enterprise deciding a vast array of mobile device security policies for hundreds of employees using dozens of enterprise apps (specifically for work) that may be downloaded on hundreds or thousands of mobile devices. On the other end of the spectrum, it may be a parent who is setting security policy for three or four apps downloaded by her child on a new mobile device. Other examples include preventing or squashing a gaming app using GPS, preventing an app from using a microphone on the device to record or eavesdrop on a conversation, among many others. In either case, the governor may take into consideration the category of the app, the type and nature of app, the author, the age-appropriateness, and numerous other factors. For example, has the same author written any other apps that may have been classified as malware or posed a security threat to the device. It may determine whether there are other apps by the same author. It is at this stage that the governor decides which rules to apply for each app. In one embodiment, this is done off-line by the governor. That is, it may be done using user interfaces on a home computer or on an enterprise network computer used by an administrator where security templates provided by the security program service provider (essentially default templates) may be used or very specific rules may be set using the templates.

At step 404 the security data input at step 402 is used by the app control security program to create the actual policies. At step 406 the app control security program object code is generated based on the input from the governor regarding security policies created at step 404. The governor or service provider may also update existing security policies if needed. As described above, the object code may be used to enhance certain original object code obtained from the disassembled app. The enhancement code is inserted to adjust security and privacy settings for an app in order to protect the enterprise and end user. The original app's behavior is altered which allows the governor to control how the app behaves. For example, if an app stores sensitive account information in the clear (i.e., un-encrypted), the behavior could be changed so that all information the app creates is stored in encrypted form and which can only be accessed by that app given that the key to the stored, persistent data would be unique to the app. In many instances the enhancement code can improve the apps performance since the code is optimized for a particular use scenario.

Figure 5:
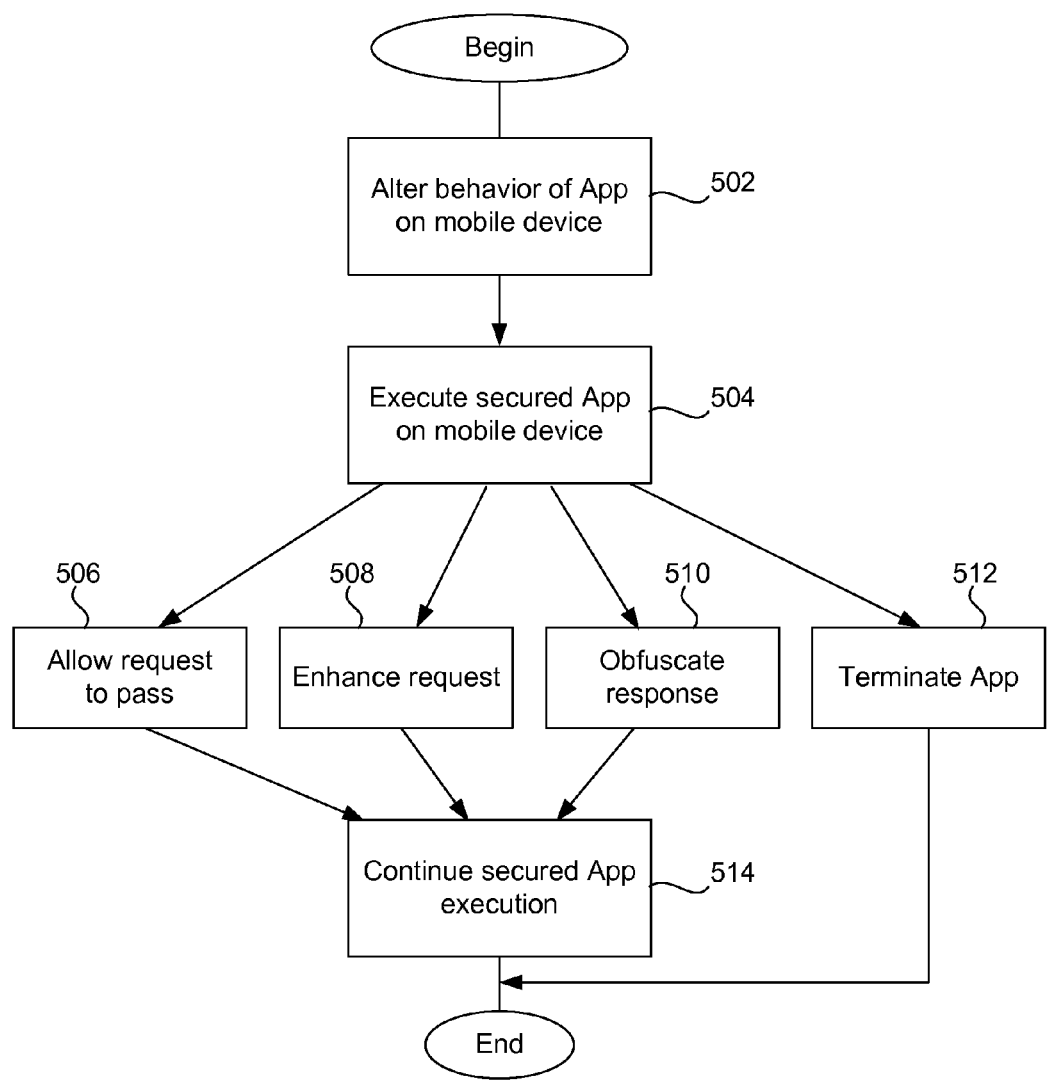
FIG. 5 is a flow diagram showing a process of a security-wrapped app executing on a handset or mobile device in accordance with one embodiment.

FIG. 5 is a flow diagram showing a process of a security-wrapped app executing on a handset or mobile device in accordance with one embodiment. At step 502 the behavior of the app when the app executes or immediately before it executes on the device is altered or modified. For example, behavior modification may include authentication during app initialization; e.g. smart/CAC card, or password challenge. Some apps, as originally designed, may not require a password for security, however, a secured version of an app which has been modified may require that the user enter a password. At step 504 the secured app executes on the mobile device by the user activating it (e.g., tapping on the icon if the device has a touch screen). Upon execution of the app, in one embodiment, control can take one of four options. As is known in the art, when an app executes, it makes calls or requests to the device operating system in order to carry out its functions. In many cases these calls may be harmless or pose no significant security threat to the phone or device. If this is the case, the call may be allowed to pass to the operating system as shown in step 506. Here the call is made to the device operating system and the app executes in a normal manner.

If the security layer or wrapper around the app detects that the app is making a request that may pose a security threat to the device, the app security layer may enhance or modify the request before it is passed to the operating system or other software or hardware component in the phone. This is shown at step 508. In one embodiment, the governor determines which calls are permissible by examining the one or more policies. For example, the governor may determine that all data should be saved in encrypted form. In another example, the governor may decide that only a select group of trusted apps should have data on a soldier's GPS coordinate. In one embodiment, there is no runtime logic to determine what is safe, a potential threat, or an actual threat; it is essentially pre-declared by the governor in the policy created at step 404 above. In another embodiment, there may be some runtime logic. For example, an app may be trying to send out expensive SMS text messages. The app control program may determine this and block the app from sending more than a certain number of text messages, for example, it may limit it to transmission of one message. The enhancement may be adding something new, such as a password requirement. In another example, if the call is to save data on the mobile device memory, the secured app may actually back up the data to a storage area in the cloud or on the Internet (i.e., off the device). In another example, the data related to the call may be encrypted.

At step 510 the secured app may determine that the call is an actual threat and should be dealt with in a more severe manner than at step 508. For example, it may have decided that based on the policy for an app, that if a camera on the device is accessed while in a secure building (e.g., the Pentagon), the app should immediately be terminated. Merely enhancing the request may not be sufficient in this case. At step 510, the request may not be allowed to proceed to the operating system or any other component of the device. However, in one embodiment, a response is returned to the app, but that response is intentionally not accurate or correct. It is essentially an obfuscated response. For example, it may be a GPS coordinate that is not the actual physical coordinate of the device (e.g., the device is in California, but the GPS coordinate that is returned to the app is a coordinate in Nebraska). This may be desirable when apps are used by children. Other examples may be returning bad or garbled data results if an app that should only run within a restrictive environment (e.g., a secure office area) is determined to be running outside that environment (e.g., at home). In this example, the app may be partially crippled so that the app can only access unclassified data and wherein classified information is nullified. In another example, when a user is attempting to paste or copy sensitive data from a classified app to a non-classified app, the app control program may change the copy of the data that is being pasted to garbage or essentially make it meaningless. After either steps 506, 508, or 510 have completed, the security-wrapped app continues execution on the mobile device at step 514.

At step 512 the security layer around the app has determined that the call being made by the app or that the app execution behavior in general poses too high a security threat level to the mobile device. In this extreme case, the security layer decides to terminate execution of the app and/or delete the app. For example, the app may be using too many resources on the phone, such as bandwidth, or is making too many high-risk calls to the operating system thereby over-exposing the mobile device. In this case, the app can simply be deleted from the phone or the app may be terminated. The user may not be able to re-execute it or re-install it. For example, an employee may not install that app again on the company phone because it was exposing sensitive company data. Or it may be determined that an app is secretly collecting data on the phone or installing malware.

Figure 6:
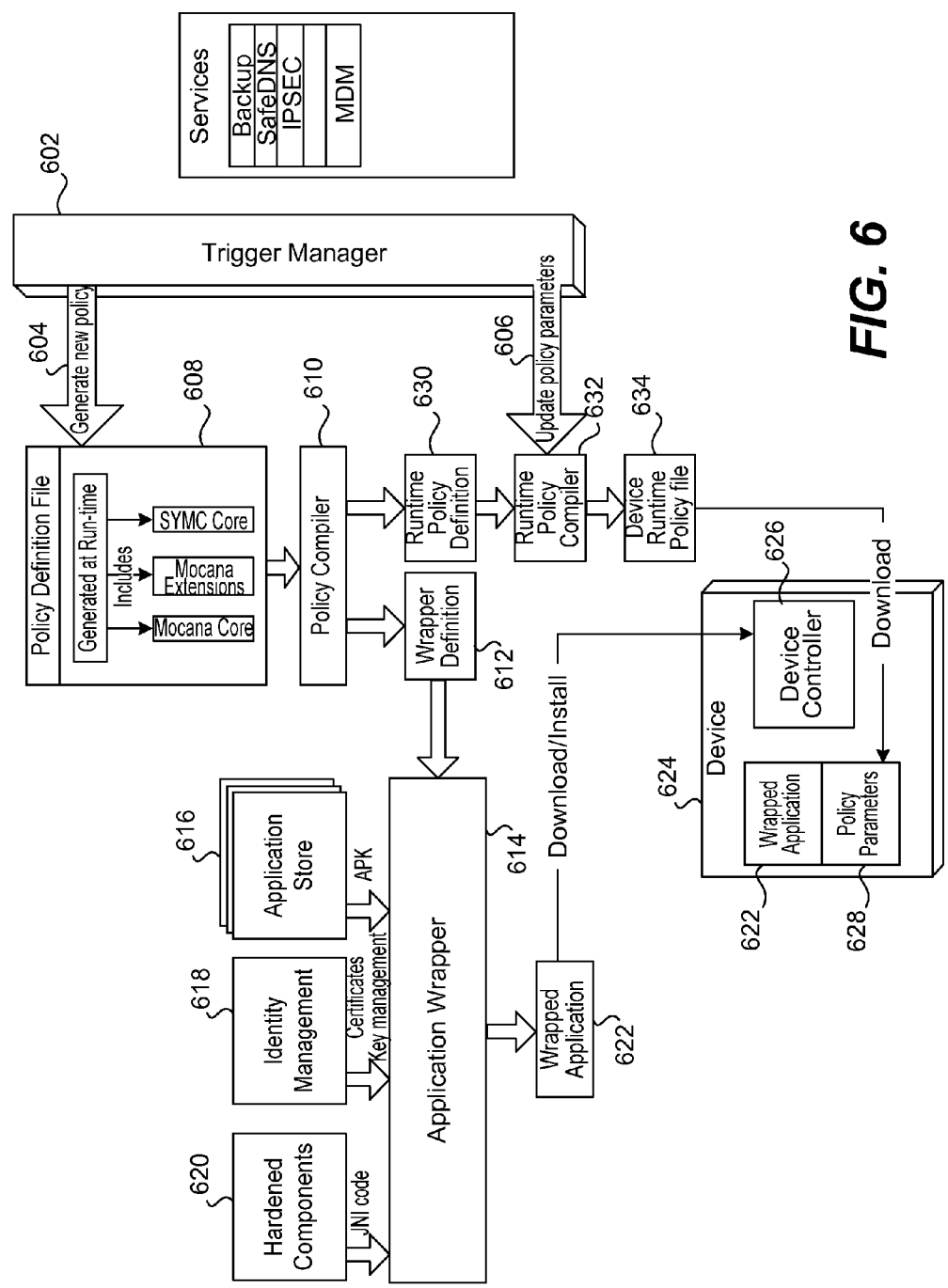
FIG. 6 is a system architecture diagram of the app security control system in accordance with one embodiment.

FIG. 6 is a system architecture diagram of the app security control system in accordance with one embodiment. A trigger manager component 602 handles two events, one for generating a new policy 604 and another for updating policy parameters 606. Such events can be triggered by various systems. For example, a console administrator or governor might apply a new policy to all devices (a manual operation). Or a network monitoring application, after detecting suspicious traffic originating from a device (or app), could push a new policy that would prevent a user/device/app from accessing network resources (an example of an automated operation). The various systems or entities that have the authority to change/update polices, do so through the trigger manager 602.

New policy output 604 is input to a policy definition file 608 which may be generated at runtime and may include various types of code and extensions, for example, specific to the app control service provider, or to the app/user/device the policy applies to. Policy definition file 608 is input to a policy compiler 610 which has two outputs. One output is a wrapper definition file 612. This file is input to an app wrapper component 614. App wrapper component 614 is responsible for generating secure app by injecting custom binary code (native or bytecode) into an app, downloaded directly, for example, from an app store. Or the app could be an app the user downloaded on to his device, and then uploaded to an "AppControl" server.

App wrapper component 614 may have three inputs: apps from one or more app stores 616, certificate key management data from identity management component 618, and hardened components 620. Key management data is used to tie the identities of the user, device, and the app, and ensure that any operation subject to policy control can be tied to a specific user/device/app. This also ensures that a wrapped application can only be run on a specific device to prevent a malicious app from circumventing policies and hardened components 620 (for example "Device security framework"). The output from app wrapper 614 is a wrapped app 622 which is downloaded or installed onto mobile device 624 via the device's controller 626. Device controller 626 responsibilities include: download app from the app wrapper; ensure that app running on the devices are appropriately wrapped apps (e.g., app wrapped for user1 should not be installed/run on device for user2); report list/version of installed applications to allow the management console to control policies for each device/user/application; and download policy parameters when appropriate. Wrapped app 622 resides on device 624 coupled with policy parameters 628.

Returning now to policy compiler 610, the other output is a runtime policy definition file 630. This file is input to a runtime policy compiler 632 which also accepts as input policy parameters 606 (specified by the management console, or other subsystems). Output from compiler 632 is a device runtime policy file 634. This file 634 is downloaded onto device 624 as shown as policy parameters 628, and is used to customize the policies applied to wrapped app 622.

Described below are various use cases and capabilities of the app control security program of the present invention. One use case involves the separation of work life and personal life on a mobile phone. There are apps for the user's personal use and apps that the user's employer (or a business partner of the employer) may have provided and the apps operate on the same phone, which is often the user's personal phone. The governor who determines security of the apps that need to be secured on the user's phone may block copy/paste operations between apps (such as e-mail apps). The governor may set policies for the work-related apps that perform selective wipes of apps and associated files. User location-based policies may also control where certain apps may execute. Examples of levels of protection because of malware are denying access to contacts, denying transmission of SMS without consent, and the like.

Another example of a use case is app control. Using the present invention, white and black listing of apps may be implemented, as well as full deletion of apps according to the policies set by a governor. An app may be 'sandboxed' to protect the other apps, software, and hardware of the device. Other capabilities may include identity-based control of apps or services and highly granular control over app behavior. Trojan identification is another use case that can be implemented with the app security program. For example, each app and content may be encrypted to prevent rogue apps from gaining access to and stealing confidential data on the phone. The security program may also be able to identify anomalous system call behavior of an app to identify malicious Trojan apps that act outside of their published intent.

Another use case is back-up and recovery of app data in which IT security administrators and governors have data revision control and can implement app and device content migration through back-up and restore operations. In another use case is network traffic monitoring. The app on the mobile device may be brought under the visibility of existing enterprise IDS/IPS/Web filtering infrastructure to allow for inspection and control of app communications. The app security program can also integrate with third-party DNS services, such as Symantec's DNS service to identify malware. All app communications may be encrypted, including communications at the mobile phone service provider. Other use cases include session continuity, consumer privacy (e.g., GPS obfuscation, implementing safe DNSs), and intercepting payment/transaction messages from the mobile device (i.e., operating in the middle of mobile commerce streams).

In one embodiment, the app security service is offered by a third-party service provider, for example, to make apps used by end-users or individuals (i.e., users not associated with an employer or enterprise). For example, a parent may want to obfuscate the GPS of a child's phone because the parent does not want a social network site, such as Facebook, to know where the child is, essentially disabling GPS. In another embodiment, an app store, operated by a wireless phone carrier (e.g., Verizon, AT&T) may offer a secured app for an extra charge or premium. A customer of the carrier can download the secured app from the marketplace or online store instead of the unsecured version by paying an extra amount. In another embodiment, an enterprise may have its own app store for its employees, partners, and the like, where users can only download secured versions of the apps (which may be referred to as "hard" apps). These apps may have many of the security features described above as defined by a governor (security administrator) at the enterprise, such as blocking copying and pasting e-mail or corporate data, killing an app from the user's phone if the user leaves the company, and so on. A mobile phone carrier's DNS can typically access any site, but the app security program can block a mobile device browser so that it can access only a safe DNS (e.g., Symantec's DNS) from where only safe Web sites may be accessed. In another embodiment, the app security program provider can work with the mobile device manufacturer to incorporate the app security program or functionality into the hardware and software operations of the device. In this embodiment, described below, a user can download an unsecured app and make is secured on the phone or device itself before executing and does not have to access a third-party service to have the app secured or ensure that the app is secured before being downloaded onto the device.

As can be seen from various embodiments described above, the security of the mobile device extends beyond the device itself and is applied directly to the apps that are downloaded onto the device. Companies and other entities are able to take advantage of apps more freely without having to worry about the security risks, such as data leakage or malware infection of the company's enterprise IT system. Companies can maintain governance of its corporate data.

In another aspect of the invention, an app on a mobile device is disabled or rendered inaccessible if the device is physically taken outside a pre-defined geographic area, such as a building or company property. A policy, which may be referred to as a "geo-fencing" policy, lets an IT administrator or other party define a geographic area in which an app can be accessed using longitude and latitude coordinates. For example, an app is blocked from opening if the mobile device is outside the defined area or will be blocked while it is running if the device transitions from within the defined area to outside the area. If an employee is using a work-related app on her mobile device and is physically in her employer's office building (the defined region), the app will function normally. A message such as "You are currently in an authorized geographic zone" may appear at some point during execution of the app (e.g., when the app first starts). If she then gets in her car and drives out of the building parking lot or walks onto a sidewalk outside the building (outside the defined region), the app will be blocked from further executing and the employee cannot access the app.

In one embodiment, a "Geo Fencing Alert" message in a window stating that "Your device is currently not in the authorized geographic area. Move to an authorized zone for access . . . " or something similar may appear on the device display. The user may then move back to the authorized area and the app will resume working. In another embodiment, once the app is blocked, the user needs to re-open or execute the app once back in the authorized region. The user cannot access anything "behind" this window and thus the app cannot be used in any manner. In one embodiment the window may partially block view of the app on the display. In another embodiment, the geo-fencing alert window takes up the entire display (so that none of the app is visible to the user). If an attempt is made to open the app outside the defined region, then the app is blocked and will not open.

In one embodiment, the geo-fencing policy is a filter for app operation. It is another way to control whether a user should be allowed to use an app. In short, it allows employers (e.g., companies, government agencies) and other enterprises to keep its employees from using work-related apps and associated data stored on employees' personal phones and tablets anywhere other than at work or in authorized, pre-defined regions or zones. An employee cannot execute such an app (and, notably, access work-sensitive data used by the app) at home, in public places, such as in coffee shops or other business premises, while traveling and the like. If the employee's phone is stolen or lost, the geo-fencing policy will prevent a third-party from executing the app unless the device is back within the defined, authorized geographic area (of course, other policies may be in effect to prevent access to the app as well, such as a passphrase policy).

The policy continually reads the device's GPS coordinates (as provided by the device's operating system) and checks if they fall within the defined area. The user can also set a level of Location Accuracy to minimize problems related, for example, to radio signal reflection. In one embodiment, there are GPS test apps to determine typical accuracy values for a given location. Location Accuracy levels for the policy are set accordingly.

In one embodiment, an IT administrator or employee at an enterprise, government agency, university, or other entity creates a geo-fencing policy through the app security program described above. The policy may be specific for an app or device (user). This may be done through a console or Web-based user interface through which the administrator or other appropriate party can create policies for the app security wrapping program. The administrator defines the geo-fencing policy parameters in the console as described in FIG. 8.

In one embodiment, the geographic region is a rectangle or square. The rectangle is defined by providing a latitude/longitude decimal degree value for an upper left coordinate of the region and a latitude/longitude decimal degree value for the lower right coordinate of the region. Horizontal and vertical lines emanate from each coordinate creating a rectangular or square region. Similar data may also be provided for the other two corners (upper right and lower left). Latitude and longitude data for a specific region may be obtained from conventional map sources on the Internet (e.g., Google Maps). Further details of this embodiment are provided below. In other embodiments, the authorized region may not be defined by a rectangle but by an arbitrary shape (e.g., octagon, circle, oval, etc.) and data other than latitude and longitude decimal degrees may be used to define the boundaries of the authorized region.

The geo-fence policy acquires the device's GPS coordinates through location services in the operating system of the device. Therefore, location services for the device and app must be enabled or on. For the app, GPS services must be authorized for the app.

In addition to the coordinates of the region when creating the geo-fencing policy, the IT administrator or other party may also enter in the console a location accuracy value which, in one embodiment, indicates a radius of a circle. Examples of location accuracy values (in meters) may be 0 (most accurate; "no restriction"), 10, 100, 1000, and 3000 (lowest accuracy). A location accuracy of 0 should only be used when location data is very reliable (e.g., there are few reflections). This is often not set as the accuracy level; the most accurate location services will claim to be is 10 meters. Other values and units may be used. Location accuracy levels are described in greater detail below as a geo-fencing policy option.

The location accuracy setting is important. The policy disregards data from the device whose accuracy is less than the desired amount. Only location data with at least the desired accuracy is considered. This concept is described in detail below. (Note that the device reports location coordinates with an accuracy number. In iOS, this number is the number of meters indicating the radius of a circle around the coordinate point, similar to the numbers described above.) This setting causes the device's location to be represented as a circle or a point.

In one embodiment, the geo-fencing policy of the app security wrapping program operates in at least two modes. One may be referred to as point-accuracy mode and the other as point-only mode.

The geo-fencing policy uses the following definitions to determine when a user's location overlaps the defined region. When IT administrator sets the Location Accuracy to "No Restriction" (0 meters) the user will be allowed to use the app if the device's coordinates (point) is contained within the defined region, also set by the IT administrator. In this case there is no circle around the coordinate point. The point must be within the defined region. If Location Accuracy is set to 10 m radius Fine, 100 m radius High, 1000 m radius Medium, or 3000 m radius Low, the device will be allowed to use the app if one of the following is true: 1) the device's location circle intersects with the defined (authorized) region; 2) the device circle is completely contained within the defined (authorized) region; and 3) the defined region itself is completely contained within the device circle AND the point (device coordinate) of the circle—which is at the center of the circle—is within the defined region. The second requirement of the third condition is because if the device point is NOT in the region, the policy knows for certain that the device is outside the defined region.

Figure 7:
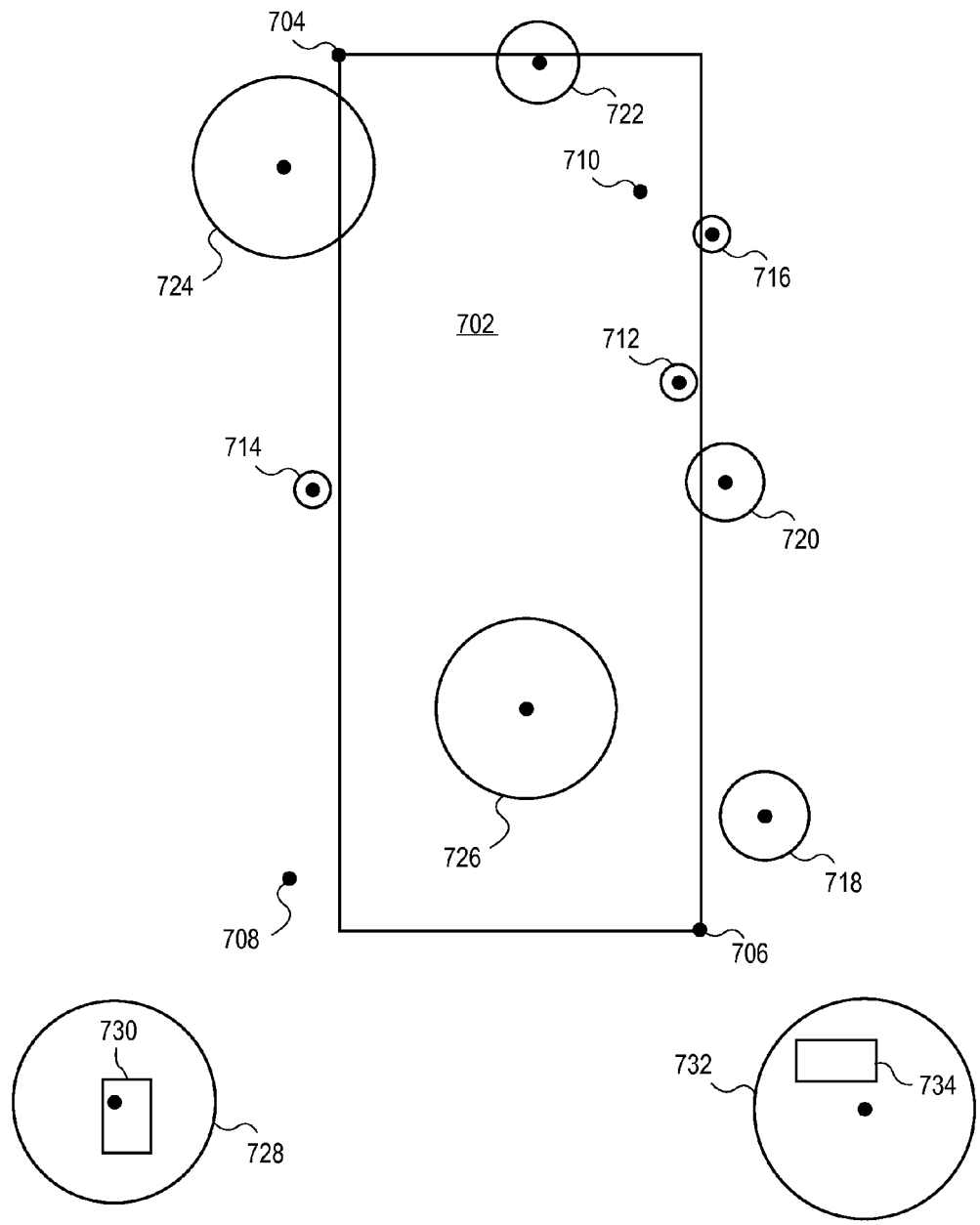
FIG. 7 is an illustration showing authorized zones, device locations, and location circles or clouds in accordance with one embodiment.

FIG. 7 is an illustration showing authorized zones, device locations, and location circles or clouds. It shows an authorized zone or area 702 defined using points 704 and 706. In other embodiments, the other two points can be used to define area 702. Points 708 and 710 show device locations and the highest Location Accuracy values as set by the IT administrator (e.g., 0 meters) and therefore no location circles (see FIG. 5 below). The device represented by 708 cannot execute the app because it is outside area 702 and device represented by 710 can since it is within area 702. There are also three points having a 10 meter ("Fine") Location Accuracy value set by the administrator: points 712, 714, and 716. The point represents the device and the circle represents the Location Accuracy setting. Device/point 714 cannot execute the app and device/points 712 and 716 can since they are within area 702 or a portion of the location circle intersects with area 702. Similarly there are three points having a High Location Accuracy (100 meters): 718, 720 and 122. Device/point 718 is outside area 702 and does not intersect. As such, the device cannot execute the app. Device/points 720 and 722 can execute the app because they are within or intersect with area 702. Shown are also two location circles 724 and 726 representing Medium Location Accuracy (1000 meters). Both these devices can execute the app for the same reasons described above (and in detail below in FIGS. 10 and 11). Note that the device represented by the point in circle 724 is clearly outside authorized area 702 by a non-trivial distance, but the device is still able to execute the app because of the geo-fencing policy setting, namely, the Location Accuracy setting. Also shown are two location circles 728 and 732. Circle 728 has within it an authorized area 730 and circle 732 has within it an authorized area 734. In circle 728, because the device/point is within authorized area 730, the app can execute. In circle 732, because the device/point is outside of authorized area 734, the app is blocked from executing. These two circles cover the situation described above in item 3, namely, that the defined region itself is completely contained within the device circle AND the point (device coordinate) of the circle is within the defined region because if the device point is NOT in the region, the policy knows for certain that the device is outside the defined region.

Figure 8:
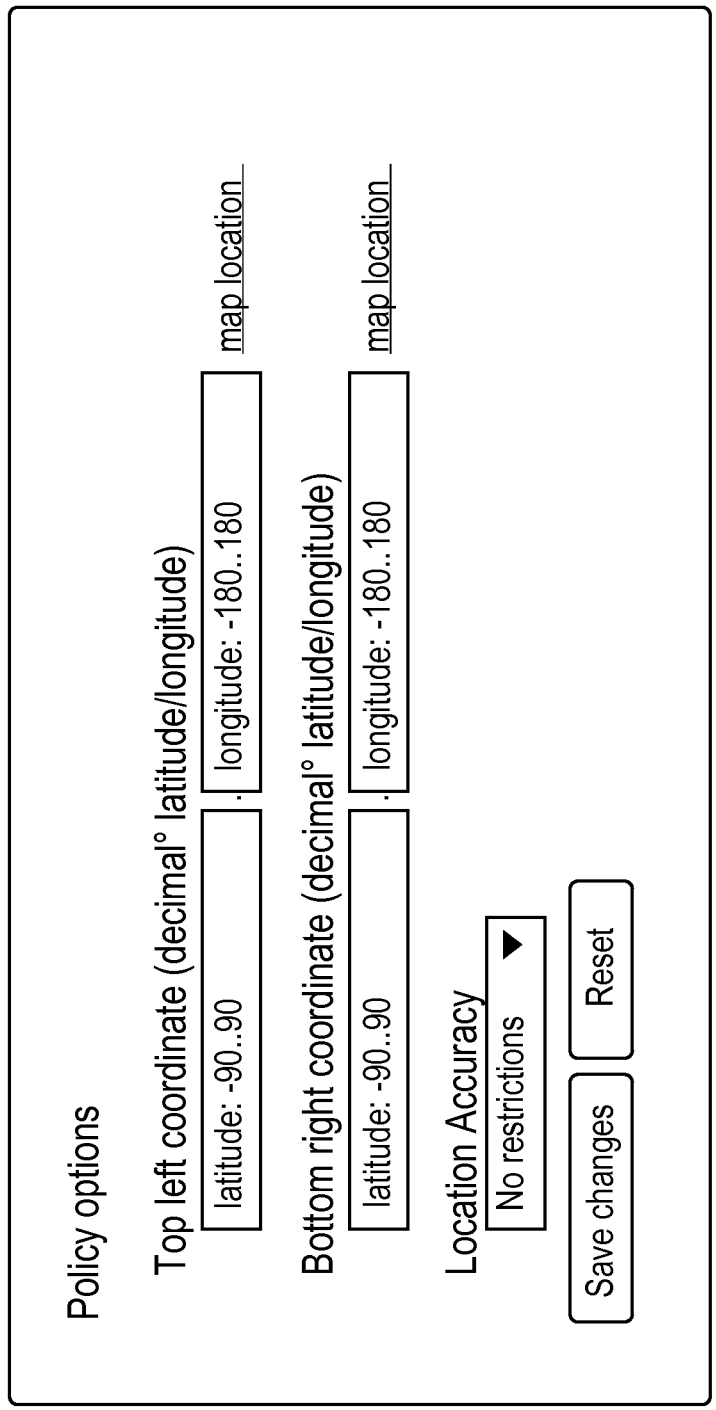
FIG. 8 is a screen diagram showing fields in the console to enter options relating to a geo-fencing policy.

The authorized or defined zone or region may be set as follows. First, the latitude and longitude of two diagonally opposite points of a rectangular element or the box defining the region is set. Once these two coordinates, for example, the top left coordinate and the bottom right coordinate, are in hand, the enterprise IT administrator (or other appropriate party) selects the Geo-Fencing policy from the app security program console. FIG. 8 is a screen diagram showing fields in the console to enter options relating to the Geo-Fencing policy. Under Policy options, the latitude and longitude decimal degrees of the top left coordinate is entered (negative numbers are used for south longitudes and west latitudes). The latitude and longitude decimal degrees of the bottom right coordinate are set. Next, the Location Accuracy value is selected. As noted, in one embodiment this is No Restriction (0 m), Fine (10 m), High (100 m), Medium (1000 m), and Low (3000 m). As noted there are GPS test apps that measure typical location accuracy values for a given location (or region). In a typical urban or developed suburban area, the location accuracy value is 100 m or 1000 m. In best cases it is typically 10 m. The enterprise IT administrator may use these tools to select the best or most appropriate Location Accuracy level. The option settings are then saved or the IT administrator can reset the options.

In one embodiment, the security program used to wrap or harden an app that uses a geo-fencing policy receives periodic location data points and, if in "POINT_ACCURACY" mode, corresponding accuracy values. In one embodiment, the location data points are received or read from the device frequently or continuously. An IT administrator has already created or defined the geo-fencing policy and entered a location accuracy value "Fine" (e.g., 10 meters). Because a geo-fencing policy has been defined for the app, the security program begins receiving location data from the mobile device operating system (which obtains it using conventional GPS or a cellular-based location service on the device) once the app starts executing. Location data (and accuracy value) may not be transmitted to the security program if it detected that the device is stationary.

In one embodiment, the device-provided location data and accuracy number (i.e., number of meters) can be visually represented by a point in the center of a circle, the radius of the circle being the accuracy value (e.g., 10 m, 100 m, etc.). Thus, as noted, location data may be a longitude and latitude decimal degree coordinate representing the center of a circle having a radius of 10 meters. In the next step, the security program filters out or discards any location data points that have an accuracy value or number greater than 10 meters (e.g., 100 m or 1000 m) indicating a lesser accuracy level. In this example, such data points do not meet the desired accuracy threshold (10 m) and are not used to determine whether a mobile device is within an authorized region.

Once the app receives location data in the form of a point and circle around it (i.e., data obtained from location service/GPG services on the device), in one embodiment, the app wrapping program determines whether any portion the circle is inside the authorized, defined region (in one embodiment, a rectangle or square, as defined by the IT administrator). If any area of the circle falls inside the authorized region, the app is not blocked. In this respect, the geo-fencing policy may be described as permissive or erring on the side of allowing use of the app. It tolerates the mobile device (i.e., theoretically, the point in the circle) being outside the authorized region so long as the accuracy value of the circle (the circle radius) is equal to or smaller than the accuracy level selected by the IT administrator (Fine, High, Medium, etc.). In this respect, the IT administrator is better off selecting a higher number (High, Medium, or Low), so the margin of error allows using the app if near (but outside) the authorized region. (Most mobile location services, whether GPS or cellular-based, will not claim to be more accurate than 10 meters.) As a result, if a mobile device is outside an authorized building, for example on a sidewalk, but within 10 meters of the outer boundary of the authorized building, the app will continue to execute. In most cases, barring high-security environments, this is desirable. Once the user moves the device more than 10 meters away from the boundary, the app will be blocked unless the IT administrator selects a less accurate level.

This more permissive embodiment may be desirable because the geo-fencing policy should not block an app from executing if the mobile device (user/employee) is anywhere within the authorized region. The user may be blocked if a "restrictive" embodiment is implemented in which the mobile device would not only have to be inside the authorized region but, in addition, while still inside the region, not closer than, e.g., 10 meters, from the boundary of the authorized region because then at least some of the surface area of the circle described above will be outside the authorized region and the app will be blocked.

The examples above illustrate "POINT_ACCURACY" mode where there is some margin of error. If the administrator is certain that the location data from the device is very precise, the accuracy value in the geo-fencing policy may be set to 0 meters. This is POINT_ONLY mode. In this mode, there is only location point data and no circle (i.e., no radius). This setting may work well in rural areas or other areas where there are few reflections from large structures. In this case, there is no accuracy data or it is ignored, and location data coordinate of the device is assumed to be exact. In this scenario, the precise latitude and longitude decimal degree contained in the location data must be inside or on the border of the authorized region. The circle, radius, intersection of surface area and region, and related concepts are not relevant (indeed, they may not exist) in this scenario.

Implementation details of the geo-fencing policy of the present invention may be different depending on the platform or operating system the device. For example, geo-fencing of an app through the security program of the present invention is done differently on an iOS platform than it is on an Android platform. For illustrative purposes only, iOS platform implementation details and considerations are provided below.

In one embodiment, GPS system data is obtained using the iOS Core Location (CL) Framework. The most useful classes for the geo-fence policy are CLLocationManager and CLLocationManagerDelegate. The CLLocationManager enables getting data such as coordinates, determine if the app is authorized to use GPS, and detect if GPS is enabled, and if the device can receive GPS data. There are two main methods of retrieving coordinates: querying the "location" property which is the most recently measured location (it has a timestamp) or implementing the CLLocationManagerDelegate protocol. If the latter protocol is implemented, the most useful methods to implement are: locationManager:didUpdateToLocation:fromLocation:
   locationManager:didEnterRegion: and
   locationManager:didExitRegion:.

When the GPS system is monitored, these methods would be called when the location of the device changes. The described embodiment implements the GeoFence object (policy), described below, using the CLLocationManagerDelegate protocol. When didUpdateToLocation is called, the GeoFence object determines if the device is likely in the geofence region. The geofence object can operate in POINT_ONLY and POINT_ACCURACY mode. Although using the didUpdateToLocation method provides more control to define regions arbitrarily, because the device would be updated with the raw GPS data as it immediately becomes available instead of being notified when the device enters/leaves a spherical region. The POINT_ONLY mode ignores accuracy information taking only the latest raw latitude and longitude data. The POINT_ACCURACY mode uses the accuracy information to define a circle (a center and a radius). The radius is defined in meters and the center is defined by a latitude and longitude in degrees. The described embodiment also implements a customized geofence region called GeoFenceRectRegion. This object contains two CLLocationCoordinate2D objects each of which contains a longitude and latitude value measured in degrees.

The POINT_ONLY mode works well in more rural areas where there are fewer reflections from large structures such as buildings. However, in more complex urban environments POINT_ACCURACY mode is recommended.

This mode creates a probability "cloud" or circle with its radius defined as the accuracy and the center as the longitude/latitude pair. The GPS system reports that the actual position is likely somewhere within the circle. Therefore, if the circle collides with the defined region or is inside the defined region, then the GeoFence object will allow the app to launch.

Figure 9:
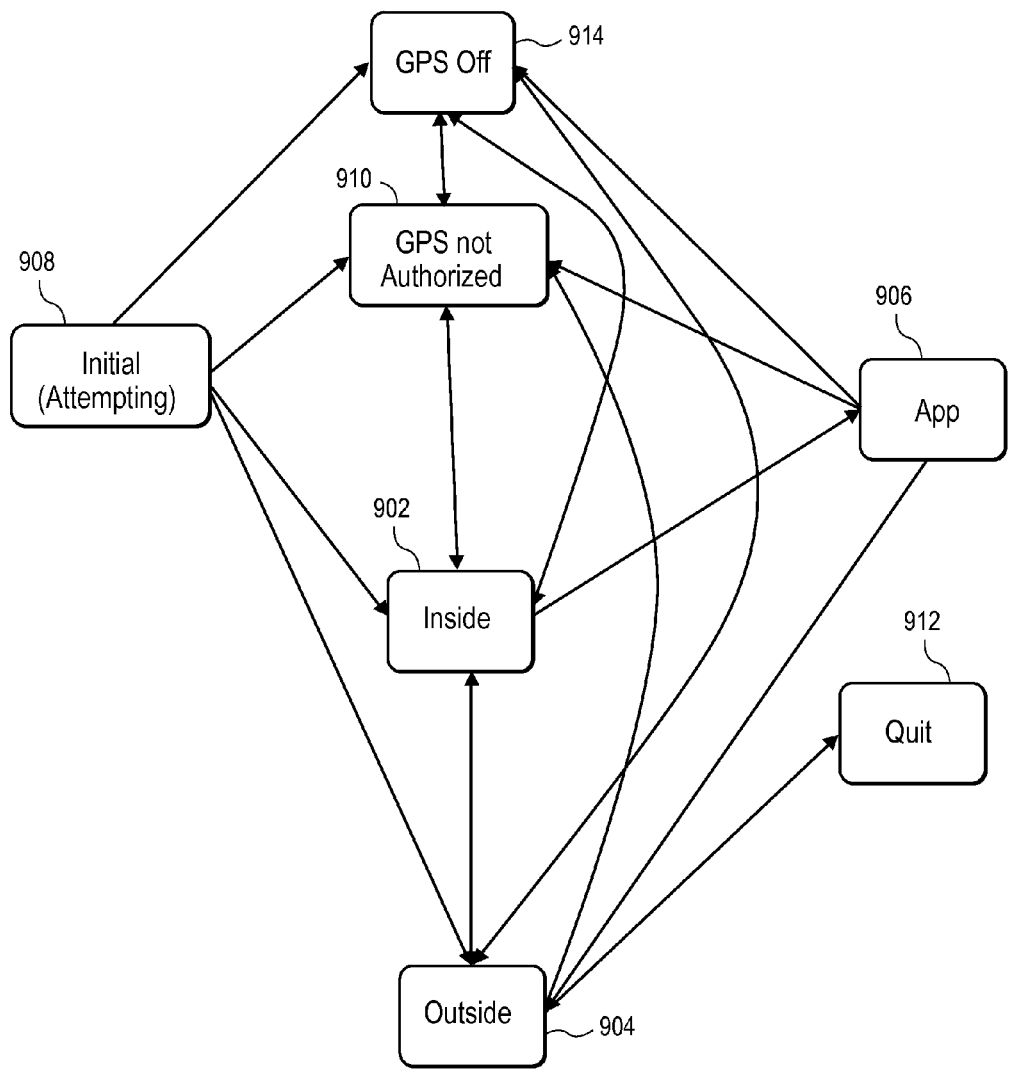
FIG. 9 is a block diagram showing various states of a GeoFence Object state machine in accordance with one embodiment.

In one embodiment, the GeoFence object is contained within the SECPGRMAppDelegate object and would be initialized within didFinishLaunchingWithOptions. Parameters passed into the GeoFence object should include a GeoFenceRectRegion and a CLLocationAccuracy object. For example:

_gf=[[GeoFence alloc]initWithRectRegion:gfRectRegion Accuracy:accuracy];

The accuracy values may come with the following options:
kCLLocationAccuracyNearestTenMeters
kCLLocationAccuracyHundredMeters
kCLLocationAccuracyKilometer
kCLLocationAccuracyThreeKilometers If accuracy is less than or equal to 0, then the GeoFence object is in POINT_ONLY mode. Otherwise (if greater than 0), it is in POINT_ACCURACY mode. Once the GeoFence object is allocated and initialized, an arbitrary number of GeoFenceRectRegion objects can be added like this:

[_gf addRegion:gfRectRegion2];

The GeoFence Object is a state machine and can be in the states shown in FIG. 9. The app state 906 shows the app receiving location data. If the app does not have GPS services authorized for it, the GeoFence object state is at "GPS not Authorized" 910. If the device does not have GPS services enabled, the object is in "GPS Off" state 914. The user is given the chance to retry to after enabling GPS services on the device. An "Initial (Attempting)" state 908 indicates that the device is attempting to obtain location data. If the device is inside the authorized zone, the GeoFence object is in "Inside" state 902 and the app will execute. If the device is outside the authorized zone, the object is in "Outside" state 904 and the user is given the option to quit.

Figure 10:
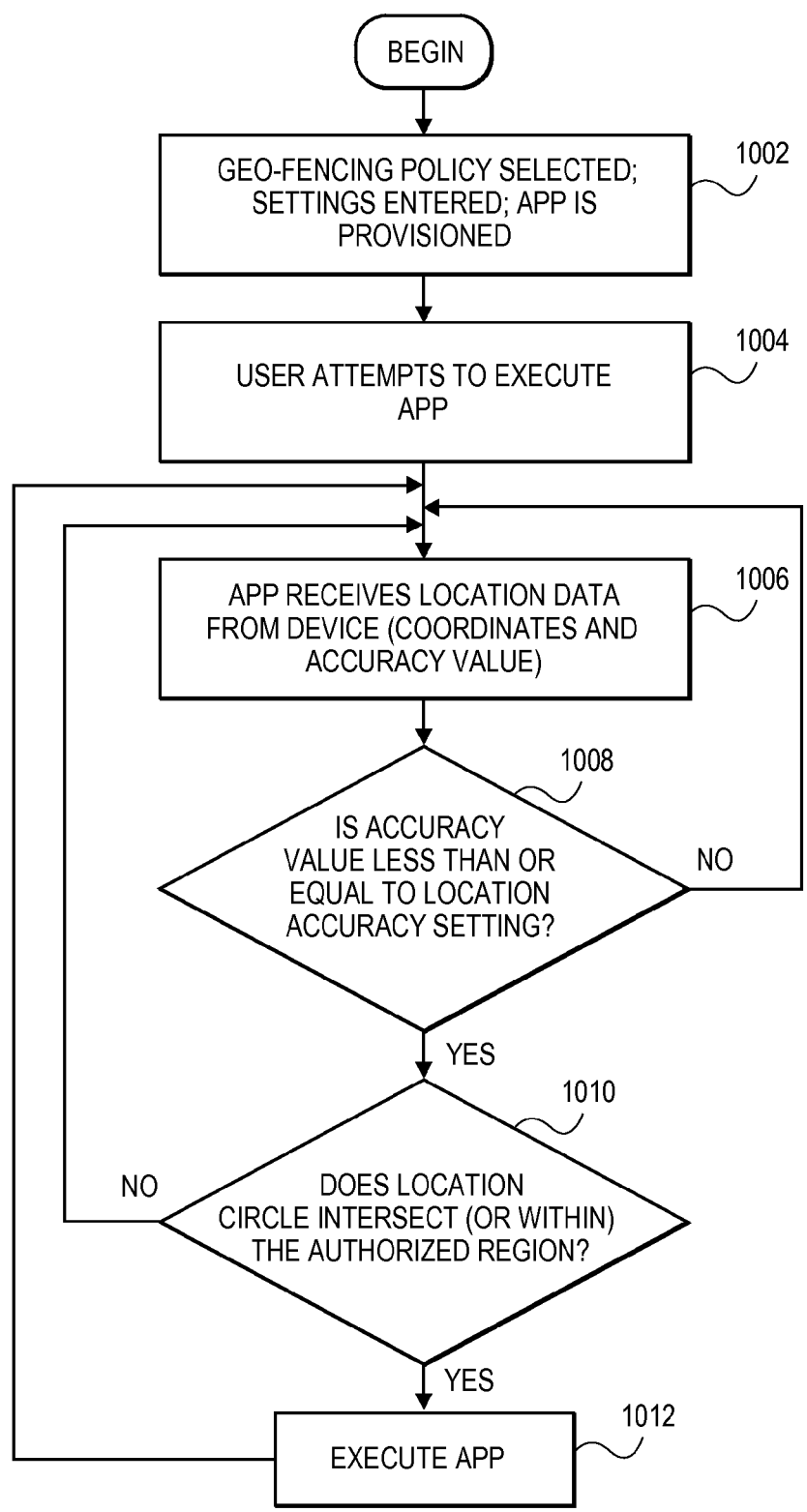
FIG. 10 is a flow diagram of a process of determining whether an app can execute or is blocked from executing on a device based on the geographic location of the device in accordance with one embodiment.

FIG. 10 is a flow diagram of a process of determining whether an app can execute or is blocked from executing on a device based on the geographic location of the device in accordance with one embodiment. At step 1002 the IT administrator has decided that a particular app cannot be used outside a specific area or zone. For example this may be a company campus, office compound, building (including, for instance, the sidewalk around it), a city that the company or entity operates in (as best encompassed by a rectangle or square), and so on. The authorized area is limited only by the accuracy or preciseness of the latitude and longitude decimal degrees provided. The coordinates are entered as shown in FIG. 8. The Location Accuracy is also selected and the settings are saved. The wrapped app is now provisioned with a geo-fencing policy.

The device-owner/user executes the app on the device at step 1004. Depending on 1) the location coordinates of the device; 2) the accuracy of the device location coordinates; 3) the pre-defined, authorized region/area; and 4) the user-selected Location Accuracy, the app will execute or be blocked from executing. At step 1006 the app receives location data in the form of coordinates from location services on the device and an accuracy value. At step 1008 the app checks to see whether the accuracy value (for example in meters) from the device is less than or equal to the Location Accuracy setting (in terms of meters) entered by the IT administrator. If it is, control goes to step 1010. If it is not, the app cannot execute and control goes back to step 1006 where the app continues to receive location data from the device. This occurs if the accuracy value (e.g., 100 meters—a medium-range accuracy value provided by many devices) is greater than the Location Accuracy value (e.g., "Fine" which is 10 m) as selected by the IT administrator. The Location Accuracy acts as a filter and in this case does not allow the app to execute because it cannot be determined with sufficient accuracy whether the device is in the authorized zone within an acceptable margin of error.

Figure 11:
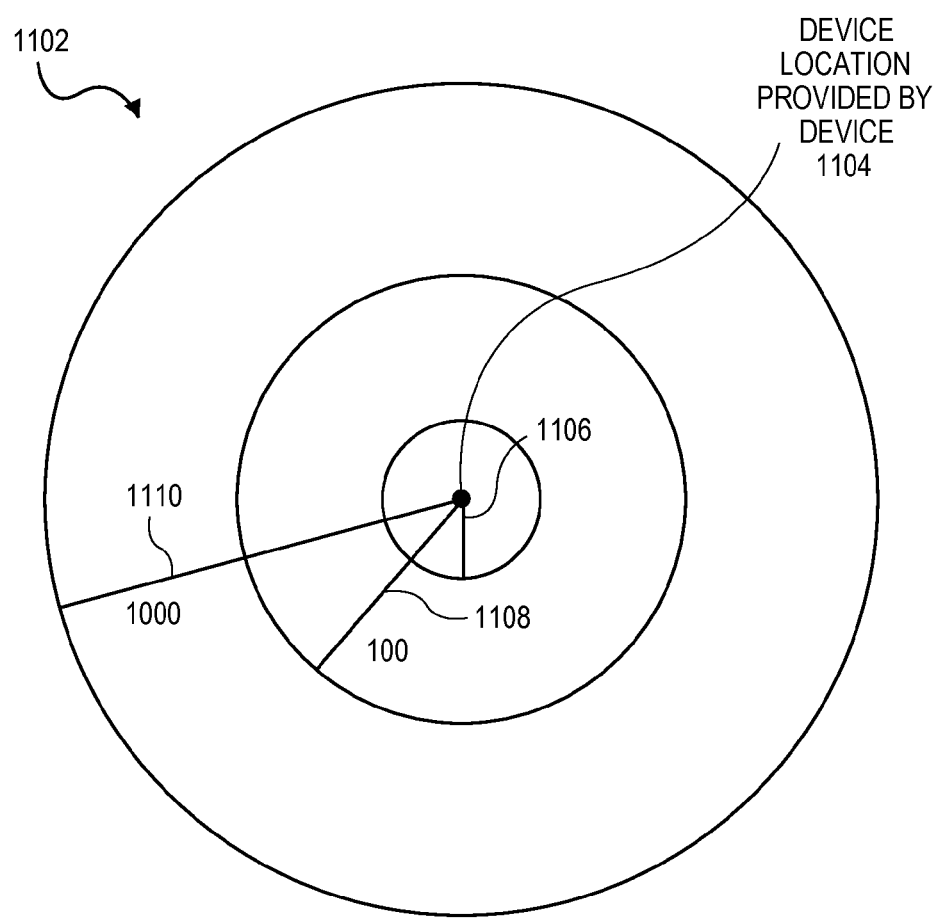
FIG. 11 is an illustration of a "location circle" having a center indicating a device location and various margins of error shown as radiuses around the center.

However, if it is, control goes to step 1010. Before this step, a "location circle" is calculated. An example is shown in FIG. 11. A location circle 1102 has at its center a device location point 1104 as provided by device location services. The circle around point 1104 is created based on the Location Accuracy selected by the IT administrator. Shown is a 10 meter radius circle, a 100 meter radius circle, and a 1000 meter radius circle (not drawn to scale). At step 1010 the app determines whether any area of the location circle intersects or is completely within the authorized zone as entered by the IT administrator. If it is, then the device is considered within the authorized zone and control goes to step 1012 where the app is allowed to execute. If none of the location circle is in the authorized zone, the app is not allowed to execute and control goes to step 1006 where the app continues to receive location data from the device. This is also the case if the app is allowed to execute and as such, control goes to 1006 even after step 1012.

Figure 12A:
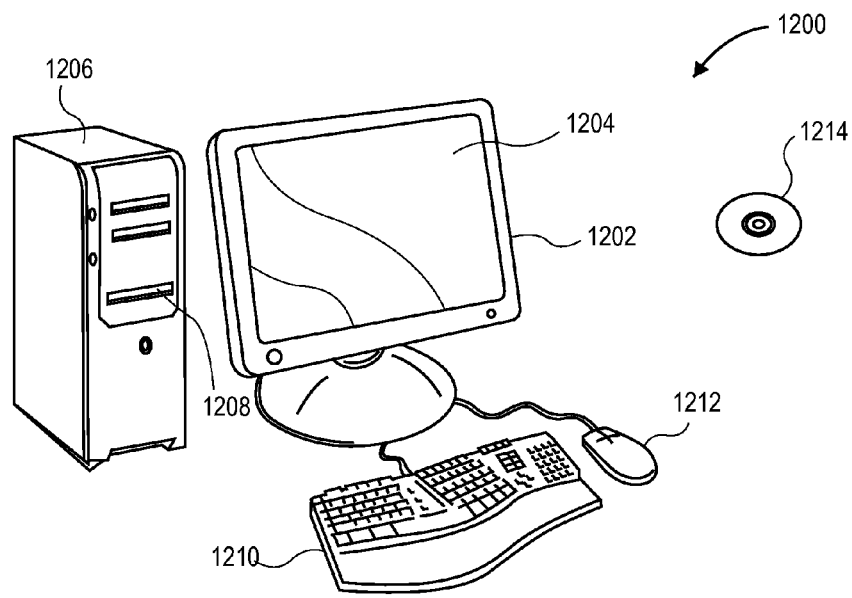
FIGS. 12A and 12B are block diagrams of a computing system suitable for implementing various embodiments of the present invention.
Figure 12B:
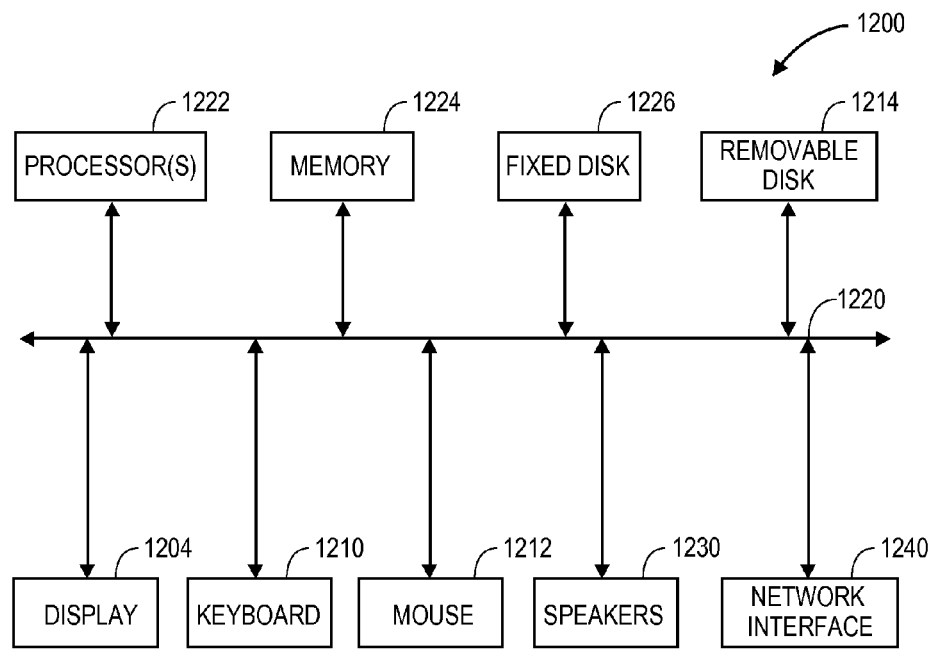

FIGS. 12A and 12B illustrate a computing system 1200 suitable for implementing embodiments of the present invention. FIG. 12A shows one possible physical form of the computing system. Of course, the computing system may have many physical forms including an integrated circuit, a printed circuit board, a small handheld device (such as a mobile telephone, handset or PDA), a personal computer or a super computer. Computing system 1200 includes a monitor 1202, a display 1204, a housing 1206, a disk drive 1208, a keyboard 1210 and a mouse 1212. Disk 1214 is a computer-readable medium used to transfer data to and from computer system 1200.

FIG. 12B is an example of a block diagram for computing system 1200. Attached to system bus 1220 are a wide variety of subsystems. Processor(s) 1222 (also referred to as central processing units, or CPUs) are coupled to storage devices including memory 1224. Memory 1224 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1226 is also coupled bi-directionally to CPU 1222; it provides additional data storage capacity and may also include any of the computer-readable media described below. Fixed disk 1226 may be used to store programs, data and the like and is typically a secondary storage medium (such as a hard disk) that is slower than primary storage. It will be appreciated that the information retained within fixed disk 1226, may, in appropriate cases, be incorporated in standard fashion as virtual memory in memory 1224.

Removable disk 1214 may take the form of any of the computer-readable media described below.

CPU 1222 is also coupled to a variety of input/output devices such as display 1204, keyboard 1210, mouse 1212 and speakers 1230. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1222 optionally may be coupled to another computer or telecommunications network using network interface 1240. With such a network interface, it is contemplated that the CPU might receive information from the network, or might output information to the network in the course of performing the above-described method steps. Furthermore, method embodiments of the present invention may execute solely upon CPU 1222 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

I claim:

1. A method of executing an application on a device using a geographical fencing policy comprising:

generating Java class files for an application security program, said Java class files dictated by the geographical fencing policy;

replacing Java class files for the application with the Java class files for the application security program, wherein the Java class files for the application that are being replaced function as a proxy between the application and a device operating system;

creating a security-wrapped application by completing said replacing of Java class files for the application, said security-wrapped application provisioned with the geographical fencing policy;

obtaining global positioning satellite location data of the device from location services on the device, including device coordinates and a device-provided accuracy value;

calculating a circular area based on a user-selected location accuracy value and device coordinates, wherein said device coordinates are a center of the circular area and the user-selected location accuracy value is a radius of the circular area;

determining whether the circular area intersects with an allowed area or is entirely within the allowed area; and enabling application execution when the device-provided accuracy value is less than or equal to the user-selected location accuracy value and when the circular area intersects with the allowed area or is entirely within the allowed area.

2. The method as recited in claim 1 further comprising:

not allowing execution of the application when the device-provided location accuracy value is greater than the user-selected location accuracy value.

3. The method as recited in claim 1 further comprising:

not allowing execution of the application if the circular area does not intersect with the allowed area or is not entirely within the allowed area.

4. The method as recited in claim 1 further comprising:

not allowing execution when the allowed area does not encompass the device coordinates and when the user-selected location accuracy value is zero.

5. The method as recited in claim 1 wherein the application is secured using an application security program and a geographical fencing policy and wherein the application receives geographical data defining an allowed area using longitudinal and latitudinal data in which the application is allowed to execute.

6. The method as recited in claim 1 wherein the application receives the user-selected location accuracy value when the application is secured.

* * * * *